H. L. DOHERTY.
PROCESS OF PRODUCING COMBUSTIBLE GAS AND FOR CARBONIZING COAL.
APPLICATION FILED SEPT. 7, 1918.

1,426,159.

Patented Aug. 15, 1922.

UNITED STATES PATENT OFFICE.

HENRY L. DOHERTY, OF NEW YORK, N. Y.

PROCESS OF PRODUCING COMBUSTIBLE GAS AND FOR CARBONIZING COAL.

1,426,159.  Specification of Letters Patent.  Patented Aug. 15, 1922.

Application filed September 7, 1918. Serial No. 253,045.

*To all whom it may concern:*

Be it known that I, HENRY L. DOHERTY, a citizen of the United States, residing at New York city, in the county of New York, State of New York, have invented certain new and useful Improvements in Processes of Producing Combustible Gas and for Carbonizing Coal; and I do hereby declare the following to be a full, clear, and exact description of the invention, such as will enable others skilled in the art to which it appertains to make and use the same.

This invention relates to a process of producing combustible gas and for carbonizing coal.

A large proportion of the gas manufactured for domestic consumption in this country contains a large percentage of what is commonly known as "blue water gas". Blue water gas is made by passing steam through an incandescent bed of coke to decompose the steam and form hydrogen and carbon monoxide. Carbon dioxide is always formed in the production of water gas and the gas-making operation is generally controlled by maintaining a deep fuel bed and comparatively high temperatures to produce a minimum percentage of carbon dioxide and a maximum percentage of carbon monoxide. Water gas is made in two stages, the first stage being a blasting stage to raise the temperature of the fuel bed sufficiently high to decompose steam, and the second stage consisting in passing steam into contact with the heated fuel bed to form gas. The fuel bed is usually supported on removable grate bars and the entire bed is heated by blasting air upwardly therethrough. The air is introduced cold into the fuel bed to avoid burning out the grate bars and the products of combustion leave the fuel bed in a highly heated condition and often carry combustible gases out of the furnace. In the gas-making operation, steam is introduced into the bottom of the fuel bed and the gas leaving the top of the furnace from the fuel bed is very hot and has to be cooled before it can be purified. These operations cause the loss of a large amount of heat and materially decrease the efficiency of the process.

The primary object of the present invention is to provide a process for making water gas by which a minimum amount of heat is removed by the products issuing from the apparatus in which the process is carried out.

The process and apparatus of the present invention are similar to those described in my prior Patent No. 1,197,804, granted September 12, 1916, for a method of carbonizing coal. The present invention differs essentially from the invention of the above patent in that the present invention refers to the manufacture of water gas while the invention of the prior patent refers to the manufacture of coal distillation gas. The claims of the above patent are directed broadly to a process of carbonizing coal while producing gas, and some of the more specific claims are directed to a process of carbonizing coal and producing a distillation of coal gas. The claims of the present application are directed to a process of producing water gas.

In the process of carbonizing coal described in my patent above referred to, coal is passed downwardly in a column through a shaft furnace and a hot mid portion is formed in the column by intermittently blasting air transversely through it. Between the blasting operations, gas is circulated upwardly through the column, which acts to absorb heat from coke in the column as it advances toward the hot mid portion and acts to supply heat for distillation of coal in the column as it advances away from the hot mid portion. Some of the volatile materials distilled from the coal condense in the upper portion of the fuel column in the form of tar or oil and when the circulation of gas upwardly through the fuel column is stopped during the blasting operation, there is a tendency for the tar to run down into the hot mid zone. If an excess of tar reaches the hot mid zone, it will quench the hot fuel and tend to clog the fuel bed so that it is difficult to force an air blast through the bed. Further, the tar coming into contact with the hot fuel, is decomposed with a heavy deposition of carbon black, some of which is carried out of the furnace and into the heat regenerators by the blast exhaust products.

Accordingly, another object of the present invention is to provide a process of producing gas from coal in which a hot mid zone may be maintained in a fuel column by means of an intermittent air cross blast while preventing tar from reaching the hot mid zone.

A further object of the invention is to provide an apparatus in which gas may be efficiently produced and in which coal may be effectively carbonized while producing gas.

With these and other objects in view, the invention consists in the improved process of and apparatus for producing gas and carbonizing coal hereinafter described and claimed.

The various features of the invention are illustrated in the accompanying drawings, in which.

Figure 1:
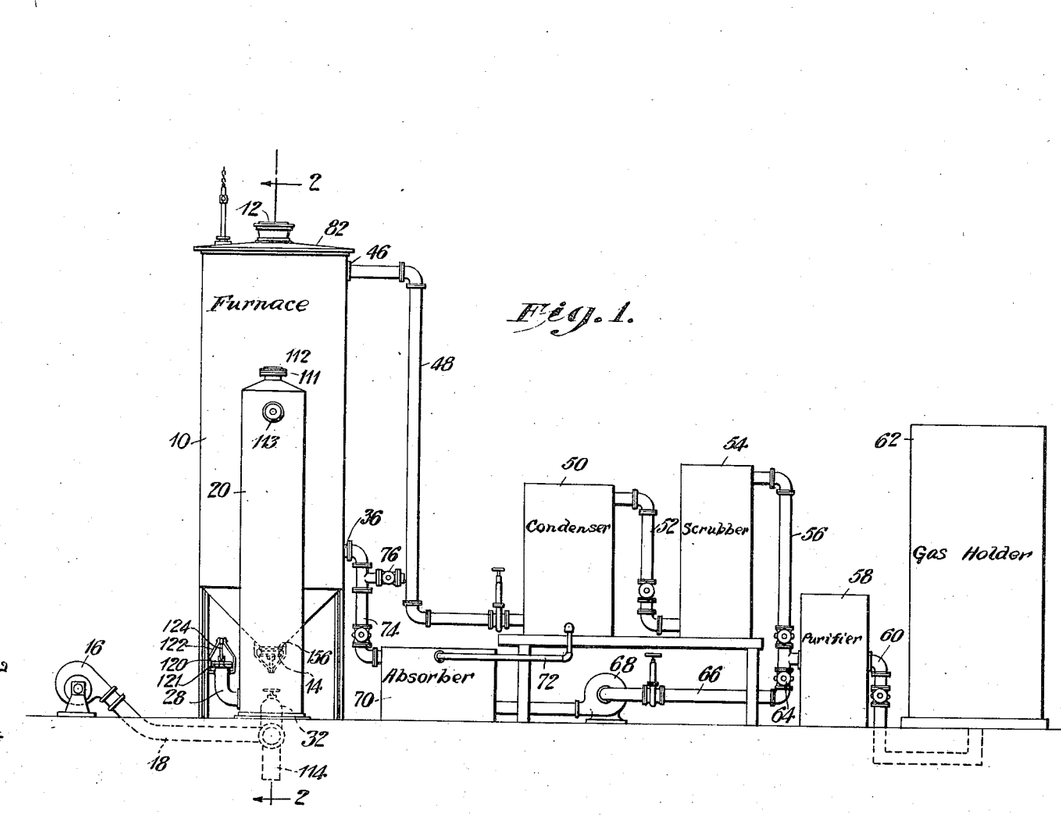
Fig. 1 is a view in side elevation of a gas-producing furnace and its auxiliary gas-treating apparatus embodying the preferred form of the invention.

To carry out the improved process in the apparatus illustrated in the drawings, fuel is passed in a column downwardly through a shaft furnace 10 (Fig. 2), the fuel being intermittently admitted to the furnace through a charging opening 12 and intermittently discharged from the furnace through an outlet gate 14. Gas is produced from the fuel in two distinct operations, namely, a blowing or heating operation and a gas-making operation. In the blowing operation, air is blasted through the fuel column by means of a blower 16 (Fig. 1). The air from the blower passes through conduits 18 into the base of one of a pair of regenerators 20 or 22, then flows up through the regenerator, and passes through a horizontal flue 24 or 26 into a mid portion of the fuel column. The blast exhaust gases pass out of the fuel column very hot and flow through one of the flues 26 or 24 into one of the heat regenerators 22 or 20 where the heat is absorbed from the gases and the gases exhaust comparatively cool through outlet pipes 30 or 28. When the heat of the exhaust gases has built up the temperature of one regenerator, the incoming air from the blower 16 is reversed by valves 32 or 34 to admit the air through the heated regenerator and exhaust the air through the regenerator previously used for preheating the air. The fuel column is blown intermittently and the direction of the blasting gas is generally reversed in successive blowing operations. In the gas-making operation, the air blast is cut off, the regenerator exhaust pipes 28 and 30 are closed, and a heat-transferring gas, generally a combustible gas, together with steam, is led into the furnace through an inlet 36 near the bottom of the fuel colmun, and passes upwardly through the fuel column countercurrent to the movement of fuel in the column. The gas enters the fuel column in a comparatively cool condition and acts to absorb heat from the coke in the lower portion of the fuel column and carry the heat toward the hot mid portion. After the gas passes through the hot mid portion, it acts to impart heat to the fuel in the upper portion of the column and leaves the column in a comparatively cool state. By means of the intermittent cross blast and the intermittent circulation of gas upwardly through the fuel column, four distinct zones are maintained in a column of fuel containing coal which consist of the hot mid zone or combustion zone 38 through which the cross blast is driven, a relatively hot coal-carbonizing zone 40 immediately above the combustion zone 38, a coal-distilling and tar-condensing zone 42 at the upper end of the column, and a coke-cooling zone 44 extending from the combustion zone 38 to the bottom of the column. With a careful regulation of the cross blast air, the heat-transferring gas and the passage of the fuel downwardly through the furnace, the temperature in the fuel column may be controlled so that the fuel will enter and leave the column in a comparatively cool state, the gases passing upwardly through the fuel column will enter and leave the fuel column in a comparatively cool state, and the cross blast air will enter and leave the heat regenerators in a comparatively cool state. In these operations, therefore, heat is always carried toward the hot mid portion of the fuel column, the heat being recuperated from the products being removed from the furnace, and utilized in the carbonization of coal and the production of gas.

The gas produced from the fuel and steam, together with the heat-transferring gas which may pass through the fuel column, are removed from the upper end of the furnace through an outlet 46 into a main 48 and pass into a water condenser 50 (Fig. 1). From the condenser 50 the gases pass through a conduit 52 into a scrubber 54, then through a conduit 56 into a purifier 58 and through a conduit 60 into a gas-holder 62. A portion of the gas advancing to the holder 62 is removed from the conduit 56 through a valve 64 into a conduit 66 and is forced by a blower 68 through a water-absorber 70. The water used in the absorber 70 consists of the water which has been previously heated in the condenser 50 and flows from the condenser through a pipe 72 into the upper portion of the absorber. The increased temperature of the water over that of the incoming gas increases the temperature of the gas and results in a large amount of water vapor being carried out with the gas. The gas-water-vapor mixture from the absorber 70 passes into a conduit 74 which is connected to the furnace gas inlet 36. In case the gas produced in the furnace 10 contains products which will be decomposed or lost when the gas passes through the hot mid portion 38, it may not be desirable to use a portion of the gas produced as a heat-transferring medium but a gas may be obtained from another source. If desired, the gas circuit through the blower 68 can be cut out entirely and live steam can be admitted through a valve 76 in the conduit 74 as the heat-transferring medium.

Figure 2:
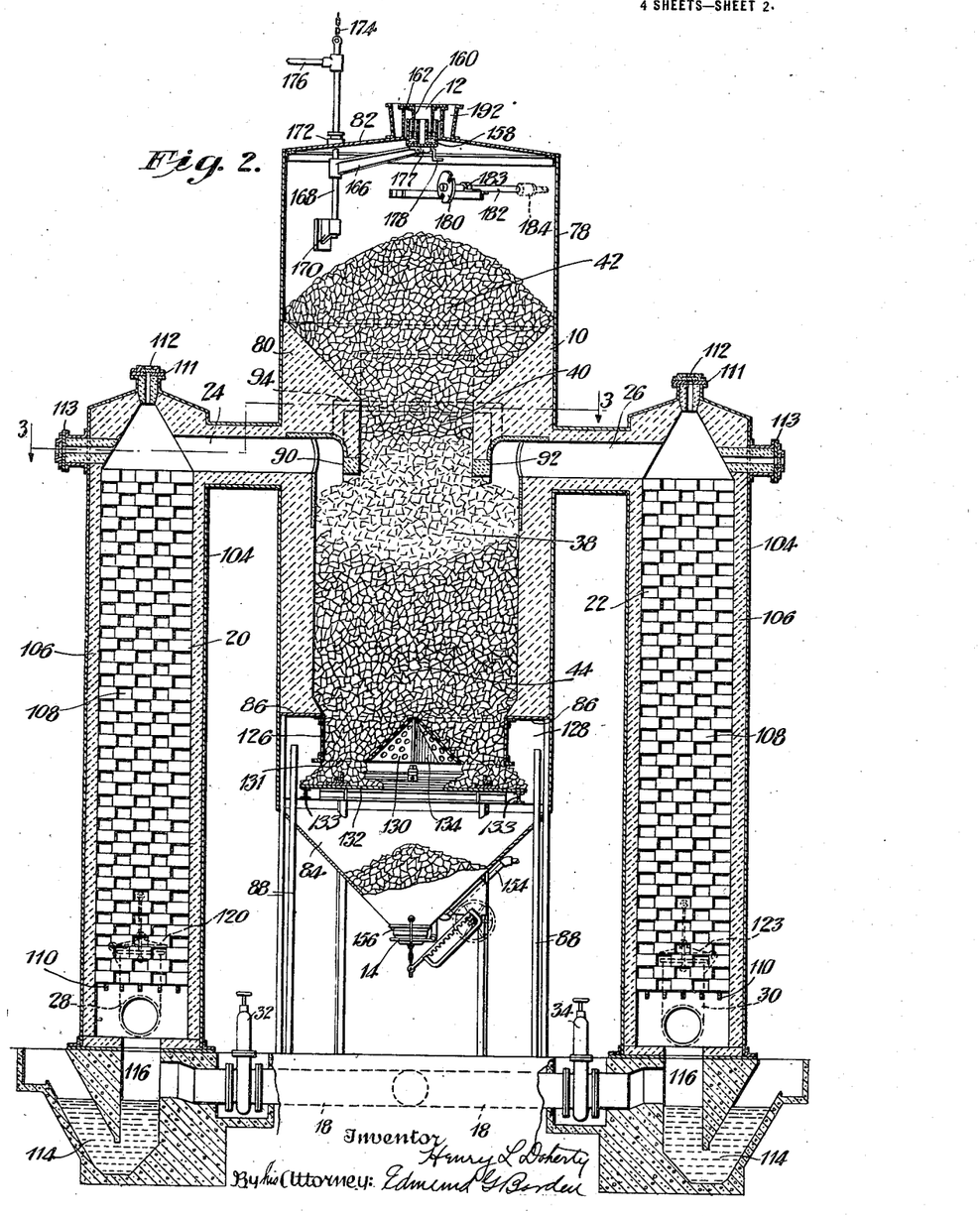
Fig. 2 is a view in vertical section taken on the line 2—2 of Fig. 1, of the gas-producing furnace.
Figure 3:
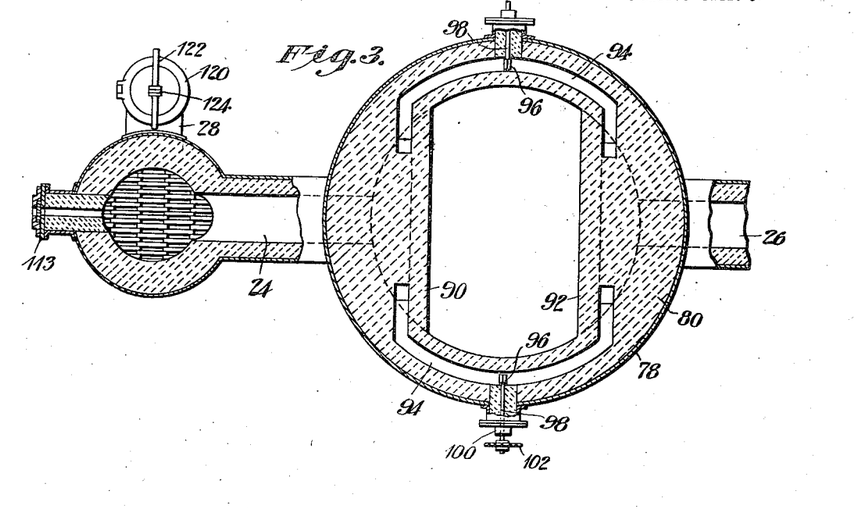
Fig. 3 is a view in horizontal section on the line 3—3 of Fig. 2 of the gas-producing furnace, one of the heat regenerators being broken away.
Figure 4:
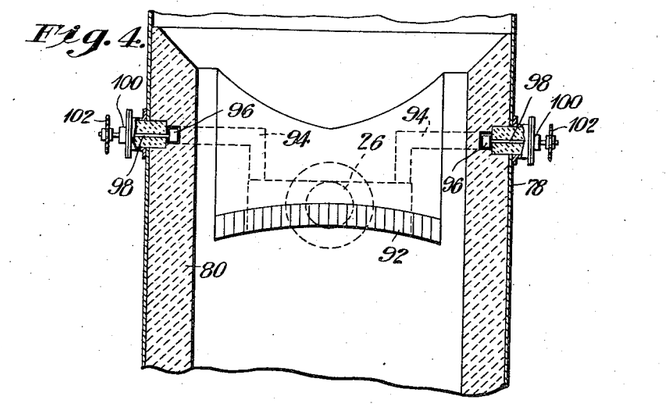
Fig. 4 is a detail view in vertical section showing the upper portion of the refractory lining of the furnace.

The shaft furnace 10 is arranged to support the fuel in a vertical column in such a manner that the fuel may be continuously advanced through the furnace while gas is being intermittently produced and coal in the fuel is being carbonized. The furnace 10 (Fig. 2), consists of a cylindrical gas-tight metal shell 78 provided with a refractory lining 80 and having a top cover 82 in which the charging opening 12 is located and a coke-discharging hopper 84 at its lower end in which the discharge gate 14 is positioned. The refractory lining 80 is positioned only in the central portion of the inner surface of the shell so that the upper and lower ends of the fuel column normally project beyond the lining. The lining 80 is supported at its lower end upon a plate 86 which is mounted upon the upper ends of columns 88 which support the metal shell 78. The upper end of the refractory lining is constructed to form a restricted opening for the passage of fuel through the coal carbonizing zone 40 and the restricted passage extends down to the upper end of the hot combustion zone 38 (Figs. 2, 3 and 4). Below the restricted passage the lining conforms to the shape of the shell 78 to increase the cross-sectional area of the fuel column so that the coal may expand into a larger space to be in an open condition to assist the cross blast in penetrating through the column. Fire arches 90 and 92 are arranged to form the lower portion of each side of the restricted passage immediately in front of the blast air flues 24 and 26 and serve to direct the cross blast downwardly into the hot mid zone 38. These fire arches confine the cross blast to the mid zone 38 and prevent a direct application of the cross blast into the coal carbonizing zone 40 so that the temperature of the coal carbonizing zone may be accurately controlled.

The fuel in the combustion zone 38 consists mainly of coke and when the blast gases pass through the mid zone, the coke is burned to produce carbon dioxide. The temperatures of the coke in the mid zone are very high and the fuel bed usually has such a thickness that the differential pressures, which may be practically used for driving the blast air, will not entirely prevent the formation of some carbon monoxide by the decomposition of carbon dioxide within the fuel bed. This carbon monoxide, therefore, will pass out through one of the flues 24 or 26 into the corresponding regenerator. To insure that all of the heat in the exhaust gases leaving the fuel bed (heat of combustion as well as sensible heat) may be removed in the regenerators 20 and 22, sufficient secondary air is led from the passages 24 or 26 around the fuel column to burn the carbon monoxide carried out of the fuel column with the blast gases. The secondary air is conducted through passages 94 which are formed in the refractory lining 80 and extend from the rear of the arch 90 around to the rear of the arch 92. Valves 96 (Figs. 3 and 4) mounted in the passages 94 are attached to rods 98 which extend through bearings 100 to the outside of the shell 78. Sprocket wheels 102 are mounted on the rods 98 which are adapted to receive chains by which the valves may be adjusted. The adjustment of the valves 96 is such that only sufficient secondary air will be conducted around the fuel column through the flues 94 to burn the carbon monoxide emerging from the fuel column with the blast gases. To protect the fire arches and the refractory lining from the high temperatures developed in the combustion of the coke in the hot mid zone and the combustion of the carbon monoxide, a carborundum facing is attached to the refractory lining and fire arches in the vicinity of the hot mid zone.

The regenerators 20 and 22 for preheating the cross blast air and for absorbing the heat of the cross blast exhaust gases consist of cylindrical gas-tight shells 104 (Figs. 2 and 3) which have refractory linings 106 covering their inner surfaces. The heat recuperation of the gases in the regenerators is effected mainly by means of a series of checker bricks 108, which are supported on grates 110 positioned near the bottom of the shells 104, and extend up to the level of the flues 24 and 26. To permit access to the top of the regenerators, manholes 111 are placed at the upper end of the regenerator shells. These manholes are normally closed and peep-holes 112 are arranged therein to permit inspection of the interior of the regenerators. Manholes 113, similar to manholes 111, are mounted on the regenerators directly opposite the flues 24 and 26.

During the blasting operation, considerable ash and fine particles of coke are carried out of the furnace with the blast gases and these pass downwardly through the regenerator. To permit the removal of this material without stopping the operation of the regenerators, dirt traps 114 are positioned at the bottom of the regenerators. The traps are formed in the concrete foundations of the regenerators and consist of vertical passages 116 positioned approximately in the center of the regenerators and inclined cleaning passages 118 connecting with the bottoms of the passages 116 and extending up to the outside of the regenerators. A fluid such as water is maintained in the trap to make a gas seal to prevent the escape of gases from the regenerator. The dirt from the interior of the regenerator collects in the bottom of the traps and may be removed with a hoe through the passages 118. The traps 114 also serve as emergency exits for gas to prevent damage from an explosion in the regenerator or furnace.

The blast air enters the bottom of the regenerators through the conduits 18 (Fig. 2) which connect with the vertical passage 116 of the traps 114. When air is led into the regenerator 20 (viewing Fig. 2) through the valve 32, the valve 34 is closed and the air passes up through the regenerator 20 to the flue 24, through the fuel column to the flue 26, down through the regenerator 22, and out through the exhaust pipe 30 to the atmosphere. During this operation, the exhaust pipe 28 of the regenerator 20 is closed by a gate 120 (Figs. 1 and 2), which is hinged to a collar 121 secured to the upper end of the exhaust pipe. To make a gas-tight seal of the pipe 28 with the gate 120, a yoke 122 is pivoted to the collar 121 and connected to the gate 120 by means of a pressure link 124. The pressure link and yoke form a toggle which will force the gate 120 into contact with the collar 121 with sufficient pressure to seal the pipe 28 when the toggle is straightened. By moving the yoke 122 to the left (viewing Fig. 2), the toggle will be broken to relieve the pressure of the gate on the collar and a continued movement of the yoke will act to swing the gate around its hinge. The exhaust pipe 30 is provided with a gate 123 similar to the gate 120 and these gates are operated to close the exhaust pipes of their respective regenerators at the time the regenerator is being used to preheat the blast air and to open the exhaust pipe when the regenerator is used to absorb the heat of the exhaust blast gases.

Figure 5:
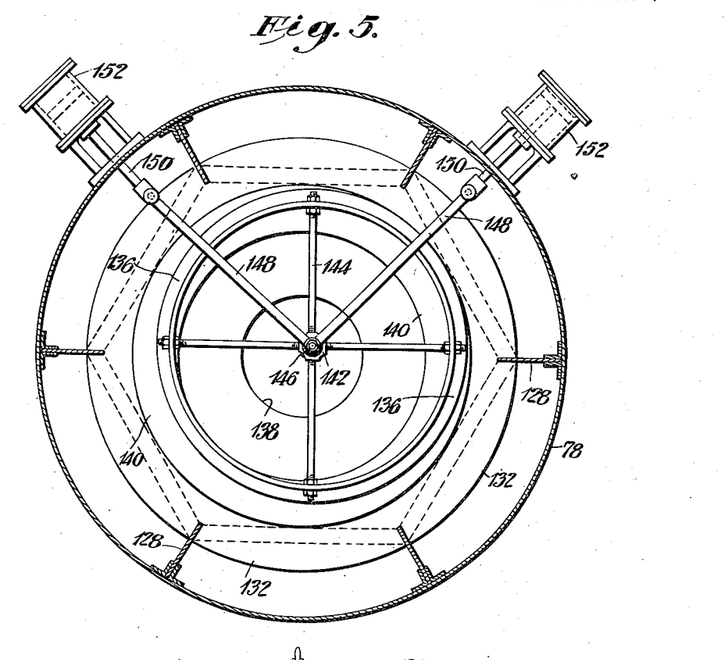
Fig. 5 is a view in horizontal section of the lower end of the furnace showing the coke-discharging scraper in plan.

To distribute the heat-transferring gas uniformly throughout the area of the fuel column, the gas is led into the lower end of the fuel column around the entire periphery and through the bottom. To accomplish this, a perforated apron 126 (Fig. 2) is secured to the plate 86 at the base of the refractory lining and to webs 128 (Fig. 5), of the columns 88 in position to surround the fuel column. The heat-transferring gas entering the shell through the inlet 36 will pass down into hopper 84, then up into a space between the shell 78 and apron 126 and enter the fuel column through the perforations in the apron 126. To distribute the gas through the bottom of the fuel column, the column is supported by a conical deflector 130 and an annulus plate 132. The deflector 130 consists of a series of perforated plates shaped to form a cone, which are supported upon a series of bars 134 secured to the apron 126. The peripheral edge of the deflector 130 is spaced from the apron 126 to provide a discharge opening 131 for the fuel of the column and the annulus plate 132 is supported, on I-beams 133 secured to the columns 88. The plate 132 is positioned below the discharge opening 131 a sufficient distance to permit the fuel to spread out upon the plate and has sufficient width to support the fuel at its angle of repose so that the fuel will not run out of the column without being positively removed from the plate. The gas from the hopper 84 passes up through the perforations in the cone 130 and also into the discharge opening 131 through the loose coke on the plate 132. Since the lower end of the fuel column is comparatively cool, the parts for supporting it may be constructed of metal.

To discharge the coke from the supporting plate 132, a scraper 136 (Figs. 2 and 5) is mounted upon the plate 132 and arranged to be reciprocated across the plate to discharge the coke through the central opening 138 of the plate and over the outer edge. The scraper 136 consists of a circular angle iron which rests on a wear-plate 140 secured to the upper side of the plate 132. To reciprocate the scraper on the supporting plate 132, a pivot block 142 is mounted at the center of the scraper on tie-rods 144, and a pivot pin 146 in the block 142 is connected with links 148 which are secured to the inner end of piston rods 150 of hydraulic engines 152. The hydraulic engines are mounted on the outer face of the shell 78 at preferably an angle of 90° with one another and these engines are coordinately operated to give a gyratory movement to the scraper to reciprocate the scraper across each part of the wear-plate 140.

The coke discharged from the plate 132 collects in the hopper 84 above the discharge gate 14. When the hopper becomes filled with coke, the discharge gate is opened to permit the coke to run out and during this operation steam is admitted into the hopper through a pipe 154 to prevent air from entering the hopper through the discharge opening. The discharge gate 14 consists of a metal cover which is hinged to a collar 156 secured to the lower end of the hopper 84. A toggle mechanism similar to the toggle 122—124 is used for operating the gate 14 which is arranged to swing the gate about its hinge and to force the gate into pressure engagement with the collar 156 to maintain a gas-tight seal for the discharge hopper.

Figure 6:
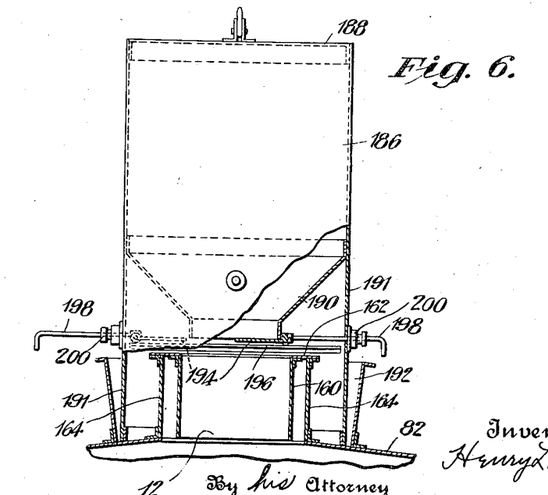
Fig. 6 is a view in side elevation, partly in section, showing the fuel-charging bucket in position over the fuel-charging opening of the furnace.

The fuel-charging opening 12 of the furnace is normally closed by a liquid sealing pan 158 which is mounted on the inside of the shell 78. To accomplish this, the charging opening 12 is formed as the inner surface of a cylinder 160 secured to a plate 162 mounted upon the upper end of a column 164 which is supported on the shell cover 82 (Figs. 2 and 6). The space between the cylinder 160 and column 164 is adapted to receive the walls of the liquid-sealing pan 158 so that the lower end of the cylinder 160 will project into the liquid of the pan. The pan 158 is mounted on the outer end of a bar 166 which is fixed on a rod 168. The lower end of the rod 168 is slidably mounted in a bearing 170 secured to the inner surface of the shell 78 and the upper end of the rod projects through a stuffing box 172 mounted in the cover 82. A chain 174 attached to the upper end of the rod 168 is adapted to be connected to a counterweight for normally holding the sealing pan in position to close the charging opening 12. A handle 176 is secured to the upper end of the rod 168 by which the rod may be operated to draw the sealing pan down from the cylinder 160 and to remove the pan from the charging opening. To permit fuel or any foreign materal which may accumulate in the charging pan 158 to be removed therefrom, the pan is arranged to be tilted on the rod 166 to discharge such material into the furnace. To this end a hinge portion 177 on the bottom of the pan is fixed on a pivot rod 178 mounted in the arm 166. The hinge portion is near the edge of the pan so that when the pan is in upright position it will be held by gravity upon the upper side of the arm 166. The pivot rod may be rotated to tilt the pan by means of a notched disk 180 which is secured to the end of a shaft 182 journalled in a bearing 183 and projecting through a stuffing box 184 to the outside of the shell 78.

The fuel is charged into the furnace by means of a transportable bucket which is arranged to make a gas-tight seal over the charging opening 12 while the fuel is being charged into the furnace. The charging bucket 186 (Fig. 6) consists of a cylindrical drum having a closed top 188 and a charging spout 190 which is positioned within the drum near its central portion. The lower end of the drum constitutes a sealing flange 191 which is arranged to enter a liquid receptacle 192 surrounding the charging opening 12. When the flange 191 is in the receptacle 192, the bucket acts as a gas-seal for the charging opening 12 so that the sealing pan may be removed from the opening to permit fuel to be charged into the furnace. The fuel is held in the bucket 186 by closing the charging spout 190 with a pair of gates 194 which are movably mounted on a track 196 secured to the flange 191. With the charging bucket in position over the charging opening 12, fuel in the bucket may be discharged into the furnace by withdrawing the gates 194 from the spout 190 by means of rods 198 which extend through packing glands 200 mounted in the flange 191.

The coke-discharging gate 14 and its operating mechanism, the coke-discharging scraper 136 and its operating mechanism, the liquid-sealing pan 158 and its operating mechanism, and the fuel-charging bucket 186, have substantially the same construction and mode of operation as the same parts which are shown and described in my copending application, Serial No. 253,046, filed September 7, 1918, for coal carbonizing furnaces, and reference is hereby made to said application for a detail description of the construction and mode of operation of these parts.

The furnace illustrated in the present application is well adapted to be used in conjunction with the coal carbonizing furnace of my application, Serial No. 253,046. With this arrangement, the coal carbonizing furnace would be used for producing coke and the coke would be used in the furnace of the present application for making water-gas. If the fuel column consists entirely of coke, only three distinct zones will be maintained in the fuel column, namely, the hot mid zone through which the cross blast is forced, the coke-cooling zone extending from the hot mid zone to the bottom of the column, and a coke-preheating zone extending from the hot mid zone to the top of the column, Steam alone may be used for the heat transferring medium for making gas from a coke-fuel column but it is preferred to use a mixture of water gas or other combustible gas and water vapors absorbed in the gas since the gas will act as a carrying medium for introducing the water vapors into the fuel column without the necessity of heating water sufficiently high to generate steam. Further, the gas of the mixture acts as a heat-transferring medium for maintaining the distinct zones in the coke column and reduces the partial pressures at which the formation of gas may take place.

If coke is not accessible for running the furnace illustrated in the drawings, this furnace may be used for carbonizing coal and producing water gas. When coal is carbonized in the furnace, coal alone or a mixture of coal with coke, the mixture depending upon the amount of volatile material in the coal, is charged into the furnace and the four distinct zones 38, 40, 42 and 44 above referred to are maintained in the fuel column. During the gas-making operation, the air blast fan 16 is shut off, the exhaust pipes 28 and 30 are closed, and the heat-transferring gas consisting of steam or a mixture of gas with water vapor, is circulated up through the fuel column. The outlet 46 and pipe 48 always remain open and during the first part of the blasting operation, the heat-transferring gas is circulated up through the fuel column with sufficient velocity to hold the oils or tars condensed in the coal-distilling zone 42 from running back into the coal carbonizing zone 40. When the air blast is built up to full pressure, the heat-transferring gas circuit is cut off and sufficient back pressure is placed on the exhaust pipe 28 or 30 by the gates 120 and 123 to force a portion of the blasting gas upwardly through the fuel column to prevent the tar or oil in the column from running down into the coal carbonizing zone. When the temperature of the hot mid zone has been built up sufficiently for making gas, the heat-transferring gas is circulated up through the fuel column before the air blast is entirely cut off to maintain the circulation of gas up through the coal carbonizing and coal-distilling zones to hold the tar and oil in the upper portion of the fuel bed. In this way, gas is always being circulated up through the fuel column above the hot mid zone to prevent tar or oil from running down into the coal carbonizing zone.

When carbonizing coal and producing gas, the temperature of the mid zone is maintained sufficiently high to decompose steam and the temperature of the coal carbonizing zone is maintained sufficiently high to decompose pitches distilled from the coal so that practically all of the heavy tars and pitches which condense in the coal-distilling zone and run back into the coal carbonizing zone, are broken up into fixed gases and free carbon. The heat-transferring gas used when carbonizing coal preferably consists of a mixture of water vapor and water gas, or any other combustible gas which will not be decomposed in passing through the hot mid zone. In this way, the water gas acts as a carrying medium to introduce the vapor into the fuel bed for making water gas and a very large amount of coal can be carbonized for producing coke. If the water gas produced in the operation, however, contains coal-distillation products which will be decomposed by passing them through the hot mid zone 38, it may be desirable to introduce steam alone at the base of the fuel column as a heat-carrying medium.

The temperatures of the fuel column are so regulated that the gases leaving the top of the furnace will have only sufficient temperature to carry off steam and other low boiling products. The heat of these gases, however, is not lost since they heat up the water of the condenser 50 and the heated water is utilized in the absorber 70. The word "steam" used in the claims as referring to a heat-transferring gas or a component of a heat-transferring gas, is intended to include water vapor which may be absorbed in a gas.

The preferred form of the invention having been thus described, what is claimed as new is:

1. A process of producing combustible gas comprising, supporting a column of fuel in a shaft furnace, intermittently blasting a combustion-supporting gas transversely through a mid portion of said column to produce a mid zone of sufficiently high temperature to decompose steam, and circulating steam upwardly through said column between said blasting operations.

2. A process of producing combustible gas comprising, supporting a column of fuel in a shaft furnace, intermittently blasting a combustion-supporting gas transversely through a mid portion of said column to produce a mid zone of sufficiently high temperature to decompose steam, and circulating a mixture of steam and gas upwardly through said column between blasting operations.

3. A process of producing combustible gas comprising, continuously passing fuel as a column downwardly through a shaft furnace, intermittently blasting a combustion-supporting gas transversely through a mid portion of said column to produce a mid zone of sufficiently high temperature to decompose steam, and circulating steam longitudinally of said column between blasting operations.

4. A process of producing combustible gas comprising, supporting a column of fuel in a shaft furnace, intermittently blasting a combustion-supporting gas transversely through a mid portion of said column to produce a mid zone of sufficiently high temperature to decompose steam, circulating steam longitudinally of said column between blasting operations, and regulating the flow of steam into said column to maintain the upper and lower ends of the fuel column comparatively cool.

5. A process of producing combustible gas comprising, supporting a column of fuel in a shaft furnace, intermittently blasting a combustion-supporting gas transversely through a mid portion of said column to produce a mid zone of sufficiently high temperature to decompose steam, circulating a mixture of gas and water vapors longitudinally of said column between blasting operations, and regulating the flow of gas through said column to maintain the upper and lower ends of the column comparatively cool.

6. A process of producing combustible gas comprising, continuously passing fuel in a column downwardly through a shaft furnace, intermittently blasting a combustion-supporting gas transversely through a mid portion of said column to produce a mid zone of sufficiently high temperature to decompose steam, and circulating a gas longitudinally of said column between blasting operations and absorbing water vapors in said gas before introducing gas into said column.

7. A process of producing combustible gas comprising, supporting a column of fuel in a shaft furnace, intermittently circulating steam longitudinally of said column, intermittently blasting a combustion-supporting gas transversely through a mid portion of said column to produce a mid zone of sufficiently high temperature to decompose steam, and regenerating the heat of exhaust blast gases to introduce said blast gases into the fuel column in a heated state.

8. A process of producing combustible gas comprising, supporting a column of fuel in a shaft furnace, intermittently circulating a mixture of steam and water vapors upwardly through said column, intermittently passing a combustion-supporting gas transversely through a mid portion of said column to produce a mid zone of sufficiently high temperature to decompose steam, and regenerating the heat of exhaust blast gases to introduce said blast gases into the fuel column in a heated state.

9. A process of producing combustible gas comprising, supporting a column of fuel in a shaft furnace, intermittently blasting a combustion-supporting gas transversely through a mid portion of said column, intermittently circulating steam longitudinally of said column, withdrawing gas from the upper portion of said furnace, cooling said gas with water, and circulating steam from said water through said column.

10. A process of producing combustible gas comprising, supporting a column of fuel in a shaft furnace, intermittently blasting the combustion-supporting gas transversely through a mid portion of said column to produce a mid zone of sufficiently high temperature to decompose steam, intermittently circulating steam upwardly through said column, withdrawing gas from the upper portion of said furnace, cooling said gas with water by heat interchange of said gas with said water while out of contact with said water, passing a portion of said cooled gas through said water to absorb water vapor in said gas, and circulating said gas vapor mixture upwardly through said column.

11. A process of producing combustible gas comprising, supporting a column of fuel in a shaft furnace, intermittently blasting a combustion-supporting gas through a mid portion of said column to produce a mid zone of sufficiently high temperature to decompose steam, intermittently circulating steam upwardly through said column, withdrawing gas from the upper portion of said furnace, passing a portion of said gas through water to absorb vapors, and circulating said gas vapor mixture upwardly through said column.

12. A process of producing combustible gas comprising, supporting a column of fuel comprising coke in a shaft furnace, intermittently blasting a combustion-supporting gas transversely through a mid portion of said column to produce a mid zone of sufficiently high temperature to decompose steam, and circulating steam longitudinally of said column between blasting operations.

13. A process of producing combustible gas comprising, supporting a column of fuel comprising a mixture of coal and coke in a shaft furnace, intermittently burning a portion of said fuel by blasting an oxygen-carrying gas transversely through said column to produce a mid zone of sufficiently high temperature to decompose steam, and circulating steam upwardly through said column between blasting operations.

14. A process of producing combustible gas comprising, supporting a column of fuel comprising coke in a shaft furnace, intermittently burning a portion of said fuel by blasting an oxygen-carrying gas transversely through said column to produce a mid zone of sufficiently high temperature to decompose steam, withdrawing combustible gas from the upper end of said furnace, cooling said gas with water, passing a portion of said gas through said water to absorb vapors, and circulating said gas and vapor mixture upwardly through said column.

15. A process of carbonizing coal and producing gas comprising, passing a column of fuel downwardly through a shaft furnace, intermittently burning a portion of said fuel by blasting a combustion-supporting gas transversely through a mid portion of said column, circulating steam upwardly through said column between blasting operations, condensing tar in said column above said mid portion, and circulating gases upwardly through said column during said blasting operations with sufficient velocity to hold tar from running down into said mid portion.

16. A process of carbonizing coal and producing gas comprising, passing a column of fuel downwardly through a shaft furnace, intermittently burning a portion of said fuel by blasting a combustion-supporting gas transversely through a mid portion of said column to produce a hot mid zone, circulating steam upwardly through said column between blasting operations, condensing tar in said column above said mid zone, and circulating blasting gases upwardly through said column during said blasting operations with sufficient velocity to hold tar from running down into said mid zone.

17. A process of carbonizing coal and producing gas comprising, passing coal continuously in a column downwardly through a shaft furnace, intermittently blasting an oxygen-carrying gas through a mid portion of said column to produce a hot mid zone therein, circularing steam upwardly through said column between blasting operations, condensing tar in said column above said mid zone, and circulating gases upwardly through said column during said blasting operation to prevent said tar from running downwardly in said column.

18. A process of carbonizing coal and producing gas comprising, passing a column of fuel downwardly through a shaft furnace, intermittently blasting an oxygen-carrying gas transversely through said column to produce a hot mid zone therein, circulating a mixture of gas and steam upwardly through said column between blasting operations, condensing tar in said column above said mid zone, and circulating gases upwardly through said column during said blasting operations with sufficient velocity to hold said tar from running down into said mid zone.

19. A process of carbonizing coal and producing gas comprising, passing a column of fuel downwardly through a shaft furnace, intermittently blasting an oxygen-carrying gas transversely through said column to produce a hot mid zone therein, controlling the passage of blast gases through said column to prevent said blast gases from direct action upon a coal carbonizing zone above said mid zone, and circulating steam upwardly through said column between blasting operations.

20. A process of carbonizing coal and producing gas comprising, passing a column of fuel downwardly through a shaft furnace, intermittently blasting an oxygen-carrying gas transversely through said column to produce a hot mid zone therein, controlling the passage of blast gas through said column to prevent the direct action of said blast gases upon a coal corbonizing zone above said hot mid zone, circulating steam upwardly through said column between blasting operations, condensing tar in the upper end of said column, and circulating gases upwardly through said column during said blasting operations with sufficient suction to hold tar from running down into said coal carbonizing zone.

In testimony whereof I affix my signature.

HENRY L. DOHERTY.